(12) United States Patent
Lonn et al.

(10) Patent No.: US 7,177,773 B2
(45) Date of Patent: Feb. 13, 2007

(54) METHOD FOR PREDICTING PERFORMANCE OF A FUTURE PRODUCT

(75) Inventors: Katherine Jane Lonn, Edelstein, IL (US); David A. Tyler, Metamora, IL (US); Trent A. Simpson, Peoria, IL (US); Nelson A. Jones, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 11/139,686

(22) Filed: May 31, 2005

(65) Prior Publication Data

US 2006/0271346 A1    Nov. 30, 2006

(51) Int. Cl.
G01N 37/00 (2006.01)
G06F 11/30 (2006.01)
G06F 11/00 (2006.01)

(52) U.S. Cl. .......................... 702/81; 702/84; 702/182; 714/25

(58) Field of Classification Search ................ 702/81, 702/84, 179, 181, 182; 714/1, 25, 37
See application file for complete search history.

(56) References Cited

U.S. PATENT DOCUMENTS

| | | | |
|---|---|---|---|
| 5,014,220 A | 5/1991 | McMann et al. |
| 5,761,093 A | 6/1998 | Urbish et al. |
| 5,765,137 A | 6/1998 | Lee |
| 6,065,133 A | 5/2000 | Draber |
| 6,253,115 B1 | 6/2001 | Martin et al. |
| 6,625,511 B1 | 9/2003 | Suzuki et al. |
| 6,834,256 B2 | 12/2004 | House et al. |
| 2002/0078403 A1* | 6/2002 | Gullo et al. ................ 714/37 |
| 2002/0120490 A1 | 8/2002 | Gajewski et al. |
| 2003/0171897 A1 | 9/2003 | Bieda et al. |
| 2004/0193958 A1 | 9/2004 | Shah et al. |

OTHER PUBLICATIONS

Daimler Chrysler Corporation, Ford Motor Company, General Motors Corporation; Potential Failure Mode and Effects Analysis, FMEA Third Edition; Jul. 2001.
JSAE 20037158, SAE 2003-01-2877, Reliability Problem Prevention Method for Automotive Components-Development of $GD^3$ Activity and DRBFM (Design Review Based on Failure Mode)- by Hirokazu Shimizu and Toshiyuki Imagawa, Tokyo Motor Company, Japanese Technical Paper No. 20037158, Publication Date Oct. 27, 2003, Society of Automative Engineers, Inc., Warrendale PA, USA.

* cited by examiner

*Primary Examiner*—Michael Nghiem
*Assistant Examiner*—Meagan S Walling
(74) *Attorney, Agent, or Firm*—Finnegan, Henderson, Farabow, Garrett & Dunner

(57) ABSTRACT

A method for predicting performance of a future product is disclosed. The method includes generating historical data for at least one product and generating a Failure Mode and Effects Analysis (FMEA) for the at least one product. The method also includes determining a relationship between an FMEA indicator of the FMEA generated for the at least one product and the historical data for the at least one product. The method further includes generating an FMEA for the future product and applying the determined relationship to the FMEA indicator from the FMEA generated for the future product to predict performance for the future product.

42 Claims, 3 Drawing Sheets

METHOD FOR PREDICTING PERFORMANCE OF A FUTURE PRODUCT

TECHNICAL FIELD

This disclosure relates generally to a method for predicting performance, and more particularly, to a method for predicting performance of a future product prior to production or market introduction.

BACKGROUND

The introduction of a product into a production environment or the marketplace may be accompanied by technical difficulties that are addressed during the life of the product. These technical difficulties may include, for example, problems associated with an incorrect production process, a poor material selection, an improper design choice, an application oversight, or other such technical difficulties. The number and magnitude of technical difficulties may directly affect the amount of warranty dollars spent by a manufacturer to correct the technical difficulties after production has begun and may factor into the profit margin associated with the product. If the technical difficulties can be predicted before the product is available to the end customer, it may be possible to reduce the likelihood or severity of the technical difficulties and the associated warranty costs.

One method that has been developed for predicting reliability is described in U.S. Patent Publication No. 2003/0171897 (the '897 publication) of Bieda et al printed on Sep. 11, 2003. The '897 publication describes a method that includes the collection of product performance data, the determination of the failure mode of detected product failures, and the completion of a Failure Mode and Effects Analysis (FMEA). The FMEA is used to determine a severity and a frequency of occurrence of the failure. The severity and frequency are then ranked with different ranking values. An initial risk assessment of each failure is calculated as the product of the ranked severity value and the selected ranked frequency of occurrence of the failure. Failures exceeding a threshold preliminary risk assessment are subject to a root cause product failure analysis. A corrective action for the root cause of failure is then determined, and a final risk assessment for each corrective action is generated.

Although the system of the '897 publication may help in determining already-occurring failures and the associated severity of the failures, it may do little to predict failures in a future product before the product reaches the marketplace. In particular, because the system of the '897 publication uses current product data to generate corrective actions applicable to the current product, it may be inapplicable to a future product that has not yet experienced failure.

Further, the system of the '897 publication may lack calibration. In particular, because the severity, frequency of occurrence, and risk assessment values are not correlated to actual historical trends, there is no way to ensure the accuracy or repeatability of the prediction method. Similarly, the system of the '897 publication does not use historical data to predict warranty costs associated with predicted reliability and quality.

The method of the present disclosure is directed towards overcoming one or more of the problems as set forth above.

SUMMARY OF THE INVENTION

In accordance with one aspect, the present disclosure is directed toward a method of predicting performance of a future product. The method includes generating historical data for at least one product and generating a Failure Mode and Effects Analysis (FMEA) for the at least one product. The method also includes determining a relationship between an FMEA indicator of the FMEA generated for the at least one product and the historical data for the at least one product. The method further includes generating an FMEA for the future product and applying the determined relationship to the FMEA indicator from the FMEA generated for the future product to predict performance for the future product.

According to another aspect, the present disclosure is directed toward a computer system having a console, at least one input device, and a central processing unit. The central processing unit is configured to receive historical data for at least one product and to receive a completed Failure Mode and Effects Analysis (FMEA) for the at least one product. The central processing unit is also configured to determine a relationship between an FMEA indicator of the FMEA generated for the at least one product and the historical data for the at least one product. The central processing unit is further configured to receive a completed FMEA for a future product and to apply the determined relationship to the FMEA indicator from the FMEA generated for the future product to predict performance for the future product.

In accordance with yet another aspect, the present disclosure is directed toward a computer readable medium for use on a computer system. The computer readable medium has computer executable instructions for performing a method including receiving historical data for at least one product. The method also includes receiving a Failure Mode and Effects Analysis (FMEA) for the at least one product and determining a relationship between an FMEA indicator of the FMEA generated for the at least one product and the historical data for the at least one product. The method further includes receiving an FMEA for a future product and applying the determined relationship to the FMEA indicator from the FMEA generated for the future product to predict performance for the future product.

DETAILED DESCRIPTION

Figure 1:
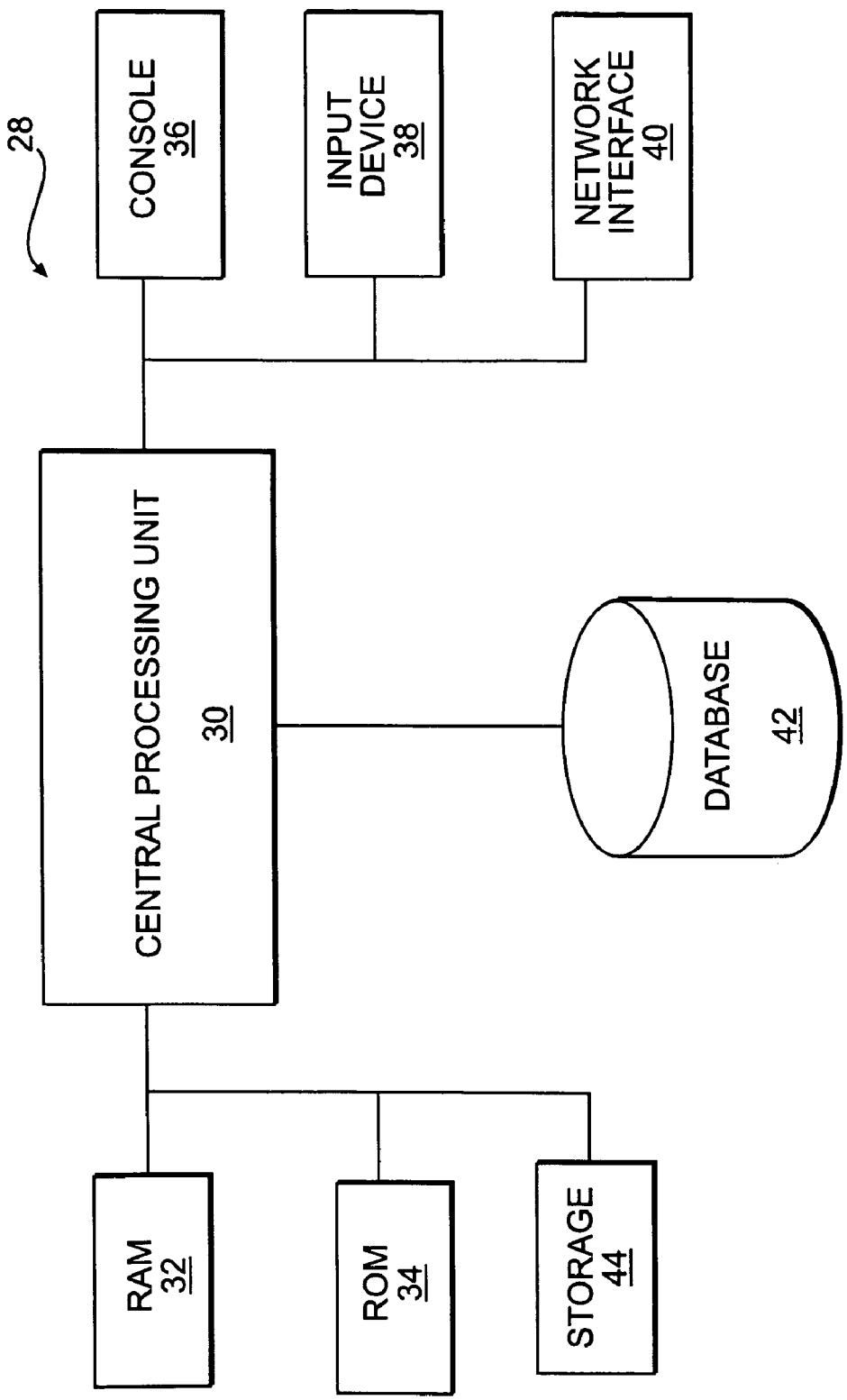
FIG. 1 is a block illustration of an exemplary disclosed computer system.

FIG. 1 illustrates a computer system 28 for predicting performance of a future product. For the purposes of this disclosure, performance may be related to quality, reliability, safety, or another similar measure. Computer system 28 may include a central processing unit (CPU) 30, a random access memory (RAM) 32, a read-only memory (ROM) 34, a console 36, an input device 38, a network interface 40, at least one database 42, and a storage 44. It is contemplated that computer system 28 may include additional, fewer, and/or different components than what is listed above. It is understood that the type and number of listed devices are exemplary only and not intended to be limiting.

CPU 30 may execute sequences of computer program instructions to perform various processes that will be explained below. The computer program instructions may be loaded into RAM 32 for execution by CPU 30 from ROM 34.

Storage 44 may be an appropriate type of mass storage provided to store information that CPU 30 may need to perform the processes. For example, storage 44 may include one or more hard disk devices, optical disk devices, or other storage devices to provide storage space.

Computer system 28 may interface with a user via console 36, input device 38, and network interface 40. In particular, console 36 may provide a graphics user interface (GUI) to display information to users of computer system 28. Console 36 may be any appropriate type of computer display device or computer monitor. Input device 38 may be provided for users to input information into computer system 28. Input device 38 may include, for example, a keyboard, a mouse, or other optical or wireless computer input devices. Further, network interface 40 may provide communication connections such that computer system 28 may be accessed remotely through computer networks.

Database 42 may contain model data and other information related to data records under analysis. Database 42 may also include analysis tools for analyzing the information within database 42. CPU 30 may use database 42 to determine historical relations or trends relating to quality information, reliability information, warranty information, and other such pieces of information.

Figure 2:
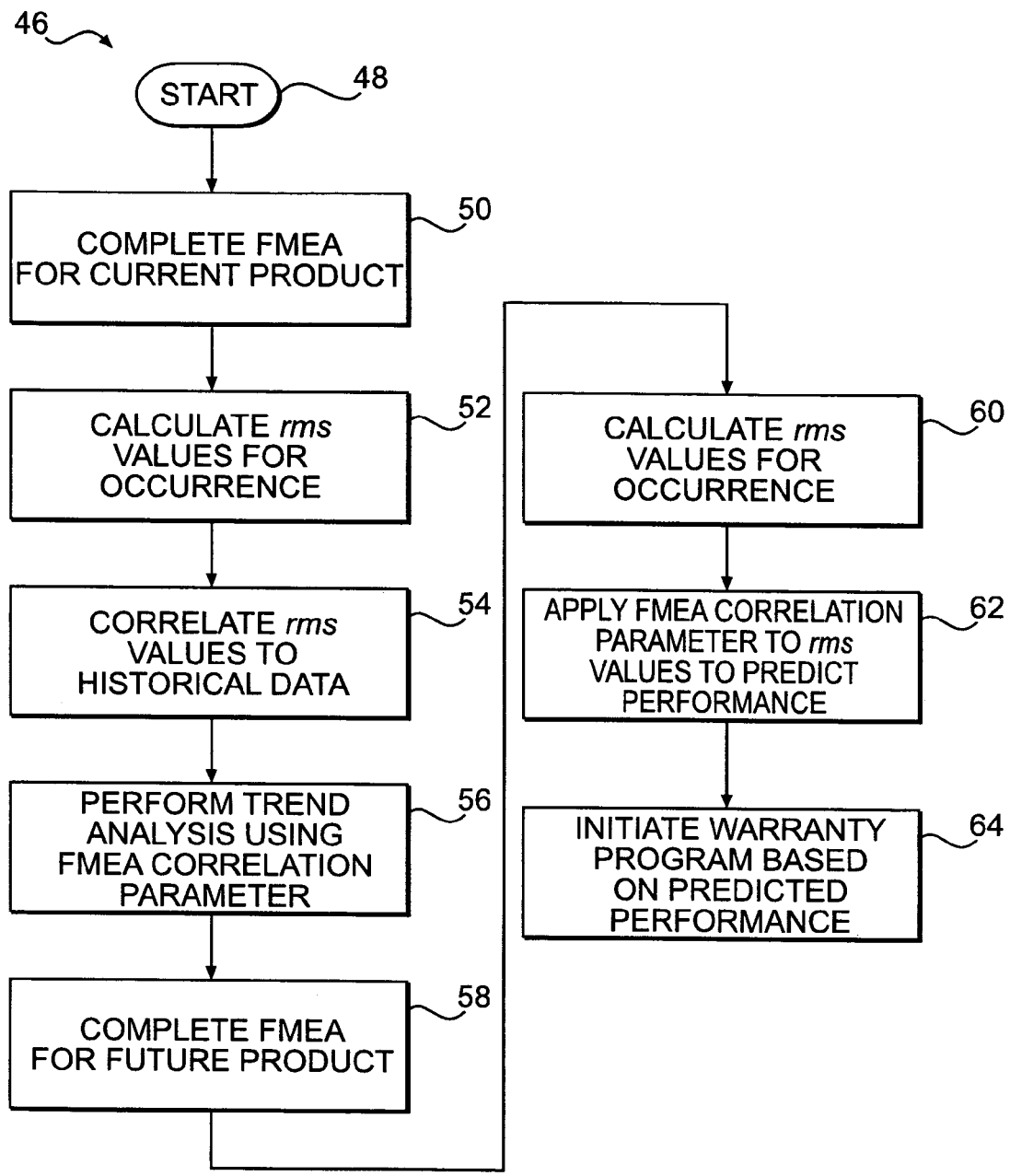
FIG. 2 is a flowchart illustration of an exemplary disclosed method.

FIG. 2 illustrates a flow chart 46 depicting an exemplary method that utilizes computer system 28 to predict performance of a future product. It is contemplated that the method may alternatively be implemented manually without the use of computer system 28. As indicated in FIG. 2, the first step after start (step 48) of the method may include completing an FMEA for a current product (step 50). For the purposes of this disclosure, a future product may include, among other things, a product designed to replace a currently offered product ("current product"), or a new product having technologies not available in the currently offered product.

For the purposes of this disclosure, an FMEA may be described as a series of outlined steps that may be followed to determine and evaluate potential failure modes of a product and effects associated with a failure. The steps may include, among other things, identifying potential modes in which a particular product could fail to meet predetermined requirements, identifying the effects of the failure on the end customer, ranking the severity of the failure effects, identifying the likely causes of the failures, and ranking the occurrence or likelihood that the cause of failure will occur. A Design FMEA (DFMEA) may be an FMEA completed by design-responsible engineers with the specific goal of increasing the robustness of design, thereby improving the reliability of a product. A Process FMEA (PFMEA) may be an FMEA completed by manufacturing-responsible engineers with the specific goal of increasing the robustness of manufacturing or assembly, thereby improving the quality of a product. Although the general term FMEA may be used through this disclosure, it is understood that a DFMEA or PFMEA may be substituted, if desired.

To complete the FMEA for the current product, a list of potential modes of failure for each subsystem of the current product and the associated effects of the failures may be generated. A severity for each failure may then be ranked, a list of potential causes of the failure generated, and the likelihood of the potential causes occurring ranked.

Once the potential causes have been ranked according to the occurrence indicator, the root mean square (rms) of the occurrence values may be calculated (step 52). The rms is the square root of the average of the squares of the set of occurrence values generated in the FMEA described above. The rms may be used to measure a magnitude of the set of occurrence values. It is contemplated that additional or different calculations may alternatively be performed to the occurrence values from the FMEA to indicate the magnitude of the set of the occurrence values and/or that the rms may be calculated from an FMEA indicator other than occurrence such as, for example, severity.

Historical data for each of the subsystems of the current product may be manipulated to create information used in the calculation of FMEA Correlation Parameters. For example, reliability measures such as Dealer Repair Frequency (DRF), quality measures such as Defects Per Million (DPM), or other such measures may be accumulated for the subsystems of the current product over a predetermined period of time. These measures may then be used along with the rms values determined above to generate FMEA Correlation Parameters according to Eq. 1 below (step 54):

$$FMEA_{Correlation\ Parameter} = \frac{DRF_{subsystem\ (Current\ product)}}{DRF_{product\ (Current\ product)}} \times \quad \text{Eq. 1}$$

$$rms_{Occurrence\ Subsystem\ FMEA\ (Current\ product)}$$

wherein:

$DRF_{subsystem\ (Current\ product)}$ is the DRF of a single subsystem of the current product;

$DRF_{product\ (Current\ product)}$ is the sum of the DRF values of all of the subsystems of the current product; and $rms_{Occurrence\ Subsystem\ FMEA\ (Current\ product)}$ is the rms value calculated from the occurrence indicator values of the FMEA performed for the current product.

It is contemplated that the FMEA Correlation Parameters may alternatively be calculated as a different function of historical information and FMEA indicators than that depicted in Eq. 1 above.

The FMEA Correlation Parameters may then be graphically displayed, tabulated, or otherwise manipulated in preparation for trend analysis. Trend analysis may be performed on the set of FMEA Correlation Parameters (step 56) to determine a general direction or inclination in which the information for the current product moves over the predetermined time period. Trend analysis may include, among other things, regression analysis, impartial regression analysis, Bayesian line fitting, or other statistical line-fitting methods known in the art. The goal of trend analysis may be to determine a function and the values of parameters for that function that cause the function to best fit the FMEA Correlation Parameters. The function may then be used to determine the accuracy of the FMEA Correlation Parameter and/or to offset the FMEA Correlation Parameter, if desired.

An FMEA for a future product may be completed at any time during the first half of the prediction process (step 58). For example, the FMEA for the future product may be completed before or after any one of steps 50–56. To complete the FMEA for the future product, a list of potential modes of failure for each subsystem of the future product and the associated effects of the failures may be generated. A severity for each failure may then be ranked, a list of potential causes of the failures generated, and the likelihood of the potential causes occurring ranked.

Once the potential causes associated with the occurrence indicator have been ranked, the rms of the ranked occurrence values may be calculated (step 60). The rms may be used to measure a magnitude of the set of occurrence values generated during the FMEA of the future product. It is contemplated that additional or different calculations may alternatively be performed to the occurrence values from the FMEA to indicate the magnitude of the occurrence numbers and/or that the rms may be calculated from an FMEA indicator other than occurrence such as, for example, severity.

Once the rms values for the future product have been generated, the FMEA Correlation Parameters may be used to predict performance for the future product. Specifically, after having been checked for accuracy and/or offset during step 56, the FMEA correlation parameters determined through step 54 may be applied to the rms values for the future product according to Eq. 2 below to generate predictions for subsystems of the future product corresponding to the measures originally used to calculate the FMEA Correlation Parameters (step 62):

$$DRF_{subsystem\ (Future\ product)} = \frac{Corrected\ FMEA_{CorrelationParameter} \times DRF_{product\ (Current\ product)}}{rms_{OccurrenceSubsystem\ FMEA\ (Future\ product)}} \quad \text{Eq. 2}$$

wherein:
  Corrected $FMEA_{Correlation\ Parameter}$ is the FMEA Correlation Parameter corrected for accuracy during step 56;
  $DRF_{product\ (Current\ product)}$ is the sum of the DRF values of all of the subsystems of the current product; and
  $rms_{Occurrence\ Subsystem\ FMEA\ (Future\ product)}$ is the rms value calculated from the occurrence indicator values of the FMEA performed for the future product.

For example, if DRF was used to determine the FMEA Correlation Parameters, the FMEA Correlation Parameters may be applied to rms values of the future product to generate DRF predictions for the subsystems of the future product. Similarly, if DPM was used to determine the FMEA Correlation Parameters, the FMEA Correlation Parameters may be applied to rms values of the future product to generate DPM predictions for the subsystems of the future product.

It is contemplated that the performance predictions may be generated without completion of step 56, if desired, according to Eq. 3 below:

$$DRF_{subsystem\ (replacement)} = \frac{rms_{Occurrence\ Subsystem\ FMEA\ (predecessor)} \times DRF_{subsystem\ (predecessor)}}{rms_{OccurrenceSubsystem\ FMEA\ (replacement)}} \quad \text{Eq. 3}$$

wherein:
  $rms_{Occurrence\ Subsystem\ FMEA\ (Current\ product)}$ is the rms value calculated from the occurrence indicator values of the FMEA performed for the current product;
  $DRF_{subsystem\ (Current\ product)}$ is the DRF value of the subsystem of the current product that is under scrutiny; and
  $rms_{Occurrence\ Subsystem\ FMEA\ (Future\ product)}$ is the rms value calculated from the occurrence indicator values of the FMEA performed for the future product.

It is possible that a future product may include new technologies and/or functions that the current product does not include. In this situation, rather than using specific FMEA Correlation Parameters calculated for the current product, general FMEA Correlation Parameters may be used to predict the performance of the new technology for the future product. The general FMEA Correlation Parameter used to predict performance of the new technology may be extrapolated using FMEA-Correlation Parameters for other technologies that do exist within the current product. For example, the FMEA Correlation Parameters for existing technologies included within the current product may be averaged or otherwise manipulated to create a general FMEA Correlation Parameter used to predict performance of the new technology only available in the future product.

Warranty costs associated with the introduction of the future product into the marketplace may be calculated based on the predicted performance. For example, warranty cost may be calculated as a function of the predicted DRF of the future product and the ranked severity values of the failure effects assigned during generation of the future product FMEA. It is also contemplated that warranty cost may alternatively be calculated based on the predicted DRF of the future product and an average repair cost associated with the current product.

Warranty improvement programs based on the predictions may be implemented to reduce warranty costs associated with the future product prior to production (step 64). For example, programs may be initiated based on the predicted DPM or DRF values to drive these predicted values to a lower acceptable level prior to realization of the predictions. The DPM or DRF values may be driven to lower levels by implementing analysis, bench testing, field testing, control schemes, inspection routines, and/or other such procedures and benchmarks to affect the results of the future product FMEA and subsequent recalculation of the performance prediction. The warranty improvement programs may continue until the predicted performance measures are less than a predetermined acceptable level.

Figure 3:
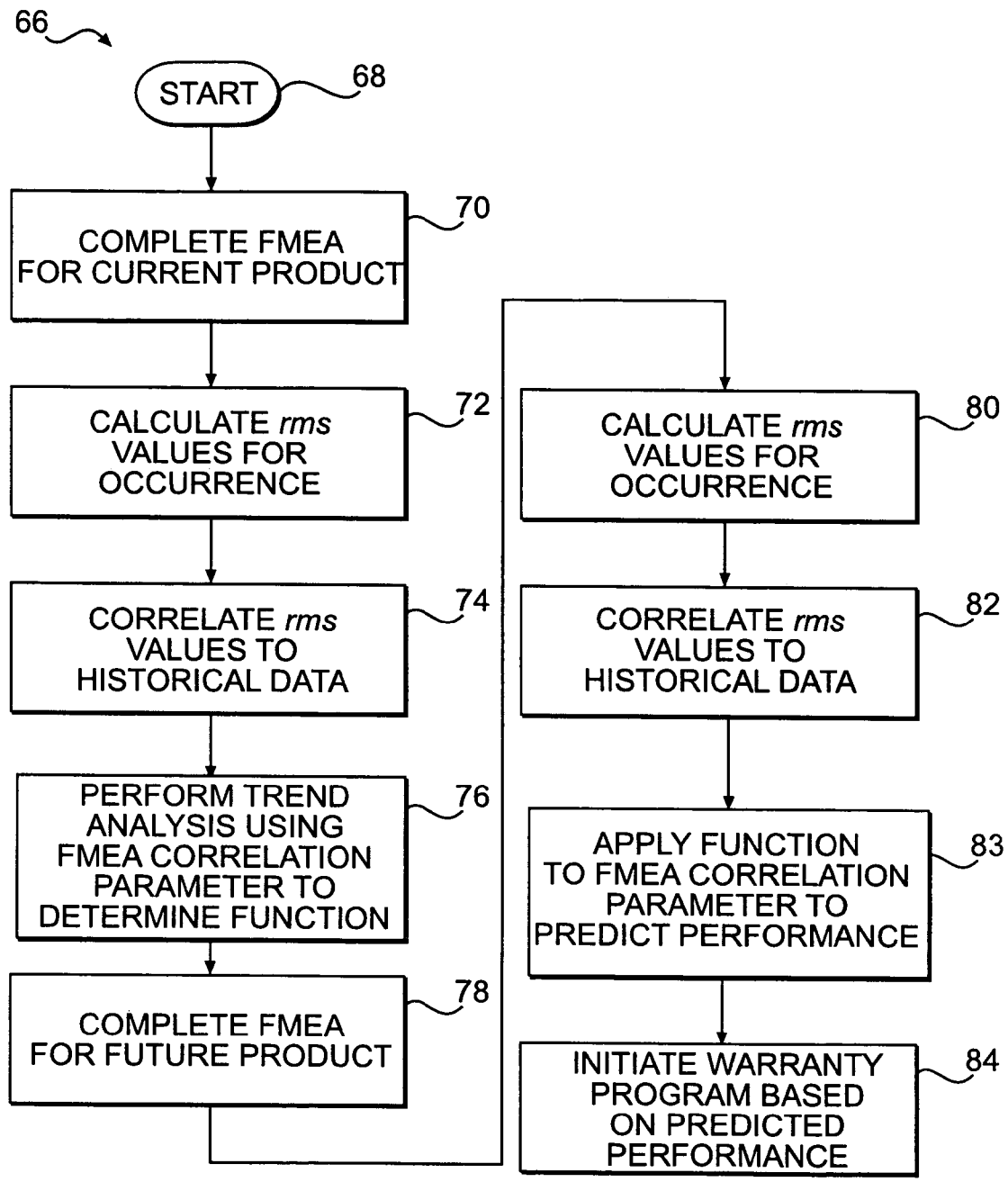
FIG. 3 is a flowchart illustration of another exemplary disclosed method.

FIG. 3 illustrates a flow chart 66 depicting another exemplary method that utilizes computer system 28 to predict performance of a future product. It is contemplated that the method illustrated in FIG. 3 may alternatively be implemented manually without the use of computer system 28. As indicated in FIG. 3, the first step after start (step 68) of the method may include completing an FMEA for a current product (step 70).

As indicated above, the FMEA for the current product may be created by listing potential modes of failure for each subsystem of the current product and the associated effects of the failures. A severity for each failure may then be ranked, a list of potential causes of the failure generated, and the likelihood of the potential causes occurring ranked.

Once the potential causes have been ranked according to the occurrence indicator, the root mean square (rms) of the occurrence values may be calculated (step 72). The rms is the square root of the average of the squares of the set of occurrence values generated in the FMEA described above. The rms may be used to measure a magnitude of the set of occurrence values. It is contemplated that additional or different calculations may alternatively be performed to the occurrence values from the FMEA to indicate the magnitude of the set of the occurrence values and/or that the rms may be calculated from an FMEA indicator other than occurrence such as, for example, severity.

Historical data for subsystems of a past product may be manipulated to create information used in the calculation of a first set of FMEA Correlation Parameters that relate the performance of the past product and the current product. For the purposes of this disclosure, the past product may be considered a predecessor of the current product. In one example, reliability measures such as Dealer Repair Frequency (DRF), quality measures such as Defects Per Million (DPM), or other such measures may be accumulated for subsystems of the past product over a predetermined period of time. These measures may then be used along with the rms values determined above in step 72 to generate FMEA Correlation Parameters according to Eq. 4 below (step 74):

$$FMEA_{CorrelationParameter\ (Past-Current)} = \frac{DRF_{Subsystem\ (Past\ product)}}{DRF_{Product\ (Past\ product)}} \text{rms}_{OccurrenceSubsystem\ FMEA\ (Current product)} \quad \text{Eq. 4}$$

wherein:
$DRF_{subsystem\ (Past\ product)}$ is the DRF of a single subsystem of the past product;
$DRF_{product\ (Past\ product)}$ is the sum of the DRF values of all of the subsystems of the past product; and
$\text{rms}_{Occurrence\ Subsystem\ FMEA\ (Current\ product)}$ is the rms value calculated from the occurrence indicator values of the FMEA performed for the current product.

It is contemplated that the FMEA Correlation Parameters may alternatively be calculated as a different function of historical information and FMEA indicators than that depicted in Eq. 4 above.

The FMEA Correlation Parameters calculated from Eq. 4 above may be functionally-related to the DRF of the current product according to Eq. 5 below.

$$DRF_{Subsystem\ (Past\ product)} = f(FMEA_{CorrelationParameter(Past-Current)}) \quad \text{Eq. 5}$$

wherein:
$FMEA_{Correlation\ Parameter\ (Past-Current)}$ is the FMEA Correlation Parameter calculated from Eq. 4 above.

Trend analysis may be performed on the FMEA Correlation Parameter (step 76) to determine this functional relationship. In other words, a specific function ("f") may be determined and the values of parameters for that function that cause the FMEA Correlation Parameters to substantially equal the DRF. Trend analysis may include, among other things, regression analysis, impartial regression analysis, Bayesian line fitting, or other statistical line-fitting methods known in the art.

An FMEA for a future product may be completed at any time during the first half of the prediction process (step 78). For example, the FMEA for the future product may be completed before or after any one of steps 70–76.

Once the potential causes associated with the occurrence indicator have been ranked, the rms of the ranked occurrence values may be calculated (step 80). It is contemplated that additional or different calculations may alternatively be performed to the occurrence values from the FMEA to indicate the magnitude of the occurrence numbers and/or that the rms may be calculated from an FMEA indicator other than occurrence such as, for example, severity.

Historical data for subsystems of the current product may be manipulated to create information used in the calculation of a second set of FMEA Correlation Parameters that relate the performance of the current product and the future product. Similar to the first set of FMEA Correlation Parameters, reliability measures such as Dealer Repair Frequency (DRF), quality measures such as Defects Per Million (DPM), or other such measures may be accumulated for subsystems of the current product over a predetermined period of time. These measures may then be used along with the rms values determined above in step 80 to generate FMEA Correlation Parameters according to Eq. 6 below (step 82):

$$FMEA_{CorrelationParameter\ (Current-Future)} = \frac{DRF_{Subsystem\ (Current\ product)}}{DRF_{Product\ (Current\ product)}} \text{rms}_{OccurrenceSubsystem\ FMEA\ (Future\ product)} \quad \text{Eq. 6}$$

wherein:
$DRF_{subsystem\ (Current\ product)}$ is the DRF of a single subsystem of the current product;
$DRF_{product\ (Current\ product)}$ is the sum of the DRF values of all of the subsystems of the current product; and
$\text{rms}_{Occurrence\ Subsystem\ FMEA\ (Future\ product)}$ is the rms value calculated from the occurrence indicator values of the FMEA performed for the future product.

It is contemplated that the FMEA Correlation Parameters may alternatively be calculated as a different function of historical information and FMEA indicators than that depicted in Eq. 6 above.

Once the second set of FMEA Correlation Parameters have been calculated, the performance of the future product may be predicted. Specifically, the particular function "f" determined through step 76 may be applied to the FMEA correlation parameters calculated during step 82 according to Eq. 7 below to generate predictions for subsystems of the future product (step 83):

$$DRF_{subsystem\ (Future\ product)} = f(FMEA_{Correlation\ Parameter\ (Current-Future)}) \quad \text{Eq. 7}$$

wherein:
$FMEA_{Correlation\ Parameter\ (Current-Future)}$ is the FMEA Correlation Parameter calculated from Eq. 6 above.

As described above with respect to the method of FIG. 1, it is possible that a future product may include new technologies and/or functions that the current product does not include. In this situation, rather than using specific FMEA Correlation Parameters, general FMEA Correlation Parameters may be used in the method of FIG. 3 to predict the performance of the new technology for the future product. The general FMEA Correlation Parameter used to predict performance of the new technology may be extrapolated using FMEA Correlation Parameters for other technologies that do exist within the current product.

Warranty costs associated with the introduction of the future product into the marketplace may be calculated based on the performance predicted through the method of FIG. 3. For example, warranty cost may be calculated as a function of the predicted DRF of the future product and the ranked severity values of the failure effects assigned during generation of the future product FMEA. It is also contemplated that warranty cost may alternatively be calculated based on the predicted DRF of the future product and an average repair cost associated with the current product.

Warranty improvement programs based on the performance prediction predicted through the method of FIG. 3 may be implemented to reduce warranty costs associated with the future product prior to production (step 84). For example, programs may be initiated based on the predicted DPM or DRF values to drive these predicted values to a lower acceptable level prior to realization of the predictions. The DPM or DRF values may be driven to lower levels by implementing analysis, bench testing, field testing, control schemes, inspection routines, and/or other such procedures and benchmarks to affect the results of the future product FMEA and subsequent recalculation of the performance prediction. The warranty improvement programs may continue until the predicted performance measures are less than a predetermined acceptable level.

INDUSTRIAL APPLICABILITY

The disclosed methods and systems may provide ways to predict performance of a future product before production or introduction of the product into the marketplace. The disclosed methods and systems may utilize historical data and Failure Modes and Effects Analysis indicators of multiple generations of products to predict quality and/or reliability measures such as Defects Per Million and Dealer Repair Frequency. General examples of implementing the disclosed methods to predict Dealer Repair Frequency of a subsystem for a future product are described below in conjunction with sample prediction tables, Table 1 and Table 2. It is understood that the type and number of products and subsystems illustrated in the tables and described below are exemplary only and not intended to be limiting.

As indicated in Table 1 below, the exemplary current and future products are engines, each having two subsystems. The subsystems include a turbocharger and a water pump, each having two associated failure modes generically labeled as failure mode 1 and failure mode 2. It is understood that the current and future products may include more or less than two subsystems, that the current and future products may have an unequal number of subsystems, that the current and future products may have different subsystems, that each subsystem may have more or less than two failure modes, that the subsystems may have an unequal number of failure modes, and/or that the subsystems may have different failure modes.

charger and water pump failure modes of the exemplary future engine were ranked as 2 and 2, and 1 and 4, respectively. After ranking the likelihood that the causes of the failure modes will occur, rms values were calculated from the occurrence rank values (step 52) as 2.236 and 3.809 for the current engine, and 2 and 2.915 for the future engine (steps 52, 60).

Following the rms calculation, FMEA Correlation Parameters were calculated according to Eq. 1 (step 54). In the above example, the FMEA Correlation Parameters were found to be 0.559 and 0.952. Following the calculation of the FMEA Correlation Parameters, regression analysis may be performed to provide an indication of the accuracy of the FMEA Correlation Parameters and to provide offset values for the FMEA Correlation Parameters, if necessary and/or desired (step 56). For purposes of simplicity, this step has been omitted from the current example.

After calculation of the FMEA Correlation Parameters and any offsetting that may have been required or desired, the FMEA Correlation Parameters were used to predict DRF for the subsystems of the future engine. In particular, Eq. 2 was used to calculate the DRF for the turbocharger and for the water pump as 0.001 (step 62).

Once the performance prediction for the future engine has been completed, additional tasks associated with the performance data may be initiated. The additional tasks may include the implementation of warranty improvement programs such as, for example, validation planning (step 64). It may also be helpful to convert the performance prediction data into warranty costs by factoring in the severity rankings from the FMEAs or the average cost of repair from the historical data associated with the current engine.

As indicated in the example of Table 2 below, the exemplary past, current, and future products are engines, each

TABLE 1

| Product | Subsystem | Failure Mode | Occurrence Ranking | rms | Actual DRF Subsystem | Actual DRF Product | FMEA Correlation Parameter | Predicted DRF Subsystem |
|---------|-----------|--------------|---------------------|-------|----------------------|--------------------|-----------------------------|-------------------------|
| Current Engine | Turbocharger | 1 | 1 | 2.236 | .001 | .004 | N/A | N/A |
|  |  | 2 | 3 |  |  |  |  |  |
|  | Water Pump | 1 | 2 | 3.809 | .003 |  | N/A | N/A |
|  |  | 2 | 5 |  |  |  |  |  |
| Future Engine | Turbocharger | 1 | 2 | 2 | N/A | N/A | .559 | .001 |
|  |  | 2 | 2 |  |  |  |  |  |
|  | Water Pump | 1 | 1 | 2.915 | N/A |  | .952 | .001 |
|  |  | 2 | 4 |  |  |  |  |  |

As previously described, the first step after start (step 48) of the method illustrated in flowchart 46 of FIG. 1 includes completing an FMEA for the current engine (step 50) to rank occurrence values for each of the failure modes of the current engine. Similarly, an FMEA for the future engine may be performed before, after, or simultaneous to the FMEA performed for the current engine to rank occurrence values for each of the failure modes of the future engine (step 58). As illustrated in Table 1 above, the occurrence values for the turbocharger and water pump failure modes of the exemplary current engine were ranked as 1 and 3, and 2 and 5 respectively. The occurrence values for the turbohaving two subsystems. The subsystems include a turbocharger and a water pump, each having two associated failure modes generically labeled as failure mode 1 and failure mode 2. It is understood that the past, current, and future products may include more or less than two subsystems, that the past, current, and future products may have an unequal number of subsystems, that the past, current, and future products may have different subsystems, that each subsystem may have more or less than two failure modes, that the subsystems may have an unequal number of failure modes, and/or that the subsystems may have different failure modes.

TABLE 2

| Product | Subsystem | Failure Mode | Occurrence Ranking | rms | Actual DRF Subsystem | Actual DRF Product | FMEA Correlation Parameter | Predicted DRF Subsystem |
|---|---|---|---|---|---|---|---|---|
| Past Engine | Turbocharger | N/A<br>N/A | N/A<br>N/A | N/A | .003 | .007 | N/A | N/A |
|  | Water Pump | N/A<br>N/A | N/A<br>N/A | N/A | .005 |  | N/A | N/A |
| Current Engine | Turbocharger | 1<br>2 | 1<br>3 | 2.236 | .001 | .004 | .958 | N/A |
|  | Water Pump | 1<br>2 | 2<br>5 | 3.809 | .003 |  | 2.721 | N/A |
| Future Engine | Turbocharger | 1<br>2 | 2<br>2 | 2 | N/A | N/A | .500 | ƒ (.500) |
|  | Water Pump | 1<br>2 | 1<br>4 | 2.915 | N/A |  | 2.186 | ƒ (2.186) |

As previously described, the first step after start (step 68) of the method illustrated flowchart 66 of FIG. 3 includes completing an FMEA for the current engine (step 70) to rank occurrence values for each of the failure modes of the current engine. Similarly, an FMEA for the future engine may be performed before, after, or simultaneous to the FMEA performed for the current engine to rank occurrence values for each of the failure modes of the future engine (step 78). As illustrated in Table 2 above, the occurrence values for the turbocharger and water pump failure modes of the exemplary current engine were ranked as 1 and 3, and 2 and 5 respectively. The occurrence values for the turbocharger and water pump failure modes of the exemplary future engine were ranked as 2 and 2, and 1 and 4, respectively. After ranking the likelihood that the causes of the failure modes will occur, rms values were calculated from the occurrence rank values (step 72) as 2.236 and 3.809 for the current engine and 2 and 2.915 for the future engine (steps 72, 80).

Following the rms calculation, the first set of FMEA Correlation Parameters were calculated from Eq. 4 (step 74) to relate the performance of the past product and the current product. In the above example, the first set of FMEA Correlation Parameters were found to be 0.958 and 2.721. Following the calculation of the first set of FMEA Correlation Parameters, regression analysis may be performed to determine the function utilized in Eq. 5 to relate the first set of FMEA Correlation Parameters calculated from Eq. 4 and the DRF values obtained for the past product from historical data (step 76). For purposes of simplicity, this step has been omitted from the current example and a generic function "ƒ" is illustrated in Table 2.

After determining the function "ƒ" that relates the first set of FMEA Correlation Parameters to the DRF of the past product, the second set of FMEA Correlation Parameters were calculated according to Eq. 6 from the rms values of the future engine and the DRF values obtained for the current engine (step 82). In the above example, the second set of FMEA Correlation Parameters were found to be 0.500 and 2.186.

Following the calculation of the second set of FMEA Correlation Parameters, the previously determined function ƒ may be applied to the second set of FMEA Correlation Parameters to predict the performance of the future engine. In particular, Eq. 7 was used to predict the DRF for the turbocharger as ƒ (0.500), and for the water pump as ƒ (2.186) (step 83).

Once the performance prediction for the future engine has been completed, additional tasks associated with the performance data may be initiated. The additional tasks may include the implementation of warranty improvement programs such as, for example, validation planning (step 84). It may also be helpful to convert the performance prediction data into warranty costs by factoring in the severity rankings from the FMEAs or the average cost of repair from the historical data associated with the current engine.

It will be apparent to those skilled in the art that various modifications and variations can be made to the methods and systems of the present disclosure. Other embodiments of the methods and systems will be apparent to those skilled in the art from consideration of the specification and practice of the methods and systems disclosed herein. It is intended that the specification and examples be considered as exemplary only, with a true scope of the disclosure being indicated by the following claims and their equivalents.

What is claimed is:

1. A method for predicting performance of a future product, the method comprising:
   generating historical data for at least one product;
   generating a Failure Mode and Effects Analysis (FMEA) for the at least one product;
   determining a relationship between an FMEA indicator of the FMEA generated for the at least one product and the historical data for the at least one product;
   generating an FMEA for the future product;
   applying the determined relationship to the FMEA indicator from the FMEA generated for the future product to predict performance of the future product corresponding to the historical data; and
   storing an indicator of the predicted performance of the future product.

2. The method of claim 1, wherein the at least one product includes a first product that is currently available to the marketplace.

3. The method of claim 2, wherein the at least one product further includes a second product that is a predecessor to the first product.

4. The method of claim 1, wherein the historical data includes Dealer Repair Frequency.

5. The method of claim 1, wherein the historical data includes Defects Per Million.

6. The method of claim 1, wherein the FMEAs are Design FMEAs.

7. The method of claim 6, wherein the performance includes reliability.

8. The method of claim 1, wherein the FMEAs are Process FMEAs.

9. The method of claim 8, wherein the performance includes quality.

10. The method of claim 1, wherein the FMEA indicator is an occurrence value.

11. The method of claim 1, further including applying a severity value from the FMEA generated for the future product to the performance predicted for the future product to predict a warranty cost associated with implementation of the future product.

12. The method of claim 1, further including applying an average cost per warranty claim for the at least one product to the performance predicted for the future product to predict a warranty cost associated with implementation of the future product.

13. The method of claim 12, wherein:
determining a relationship includes determining a relationship between the root mean square of the occurrence value of the FMEA generated for the at least one product and the historical data for the at least one product; and
applying the determined relationship includes applying the determined relationship to the root mean square of the occurrence value from the FMEA generated for the future product.

14. The method of claim 1, further including generating a warranty program based on the predicted performance for the future product.

15. A computer system, comprising:
a console;
at least one input device; and
a central processing unit configured to:
receive historical data for at least one product;
receive a completed Failure Mode and Effects Analysis (FMEA) for the at least one product;
determine a relationship between an FMEA indicator of the FMEA generated for the at least one product and the historical data for the at least one product;
receive a completed FMEA for a future product;
apply the determined relationship to the FMEA indicator from the FMEA generated for the future product to predict performance for the future product; and
store an indicator of the predicted performance of the future product.

16. The computer system of claim 15, wherein the at least one product includes a first product that is currently available to the marketplace.

17. The method of claim 16, wherein the at least one product further includes a second product that is a predecessor to the first product.

18. The computer system of claim 15, wherein the historical data includes Dealer Repair Frequency.

19. The computer system of claim 15, wherein the historical data includes Defects Per Million.

20. The computer system of claim 15, wherein the FMEAs are Design FMEA.

21. The computer system of claim 20, wherein the performance includes reliability.

22. The computer system of claim 15, wherein the FMEAs are Process FMEAs.

23. The computer system of claim 22, wherein the performance includes quality.

24. The computer system of claim 15, wherein the FMEA indicator is an occurrence value.

25. The computer system of claim 24, wherein the central processing unit is further configured to apply a severity value from the FMEA generated for the future product to the performance predicted for the future product to predict a warranty cost associated with implementation of the future product.

26. The computer system of claim 24, wherein the central processing unit is further configured to apply an average cost per warranty claim for the at least one product to the performance predicted for the future product to predict a warranty cost associated with implementation of the future product.

27. The computer system of claim 15, wherein the central processing unit is further configured to generate a validation plan based on the predicted performance for the future product.

28. The computer system of claim 15, further including at least one database, wherein the central processing unit is further configured to retrieve the historical data for the at least one product from the at least one data base.

29. A computer readable medium for use on a computer system, the computer readable medium having computer executable instructions for performing a method comprising:
receiving historical data for at least one product;
receiving a Failure Mode and Effects Analysis (FMEA) for the at least one product;
determining a relationship between an FMEA indicator of the FMEA generated for the at least one product and the historical data for the at least one product;
receiving an FMEA for a future product;
applying the determined relationship to the FMEA indicator from the FMEA generated for the future product to predict performance for the future product; and
storing an indicator of the predicted performance of the future product.

30. The computer readable medium of claim 29, wherein the at least one product includes a first product that is currently available to the marketplace.

31. The computer readable medium of claim 29, wherein the at least one product further includes a second product that is a predecessor to the first product.

32. The computer readable medium of claim 29, wherein the historical data includes Dealer Repair Frequency.

33. The computer readable medium of claim 29, wherein the historical data includes Defects Per Million.

34. The computer readable medium of claim 29, wherein the FMEAs are Design FMEA.

35. The computer readable medium of claim 34, wherein the performance includes reliability.

36. The computer readable medium of claim 29, wherein the FMEAs are Process FMEAs.

37. The computer readable medium of claim 36, wherein the performance includes quality.

38. The computer readable medium of claim 29, wherein the FMEA indicator is an occurrence value.

39. The computer readable medium of claim 29, wherein the method further includes applying a severity value from the FMEA generated for the future product to the performance predicted for the future product to predict a warranty cost associated with the implementation of the future product.

40. The computer readable medium of claim 29, wherein the method further includes applying an average cost per warranty claim for the at least one product to the performance predicted for the future product to predict a warranty cost associated with the implementation of the future product.

41. The computer readable medium of claim 29, wherein:
- determining a relationship includes determining a relationship between the root mean square of the occurrence value of the FMEA generated for the at least one product and the historical data for the at least one product; and
- applying the determined relationship includes applying the determined relationship to the root mean square of the occurrence value from the FMEA generated for the future product.

42. The computer readable medium of claim 29, wherein the method further includes generating a validation plan based on the predicted performance for the future product.

* * * * *